United States Patent [19]

Kite, III et al.

[11] Patent Number: 4,891,256
[45] Date of Patent: Jan. 2, 1990

[54] WRAPAROUND CLOSURE DEVICE AND A METHOD OF MAKING SAME

[75] Inventors: Joseph S. Kite, III, Glenmore, Pa.; Thomas B. Conaghan, III, Rockhall, Md.; John P. Cattell, Coatesville; Richard B. Develin, Plymouth Meeting, both of Pa.

[73] Assignee: The Bentley-Harris Manufacturing Co., Lionville, Pa.

[21] Appl. No.: 488,862

[22] Filed: Apr. 26, 1983

[51] Int. Cl.$^4$ .................................................. H01D 3/06
[52] U.S. Cl. .................................... 428/36.1; 428/99; 428/36.3; 87/9; 174/DIG. 11
[58] Field of Search .................... 174/DIG. 11; 87/9; 428/99, 36

[56] References Cited

U.S. PATENT DOCUMENTS

| | | | |
|---|---|---|---|
| 2,120,301 | 6/1938 | Tishman | 174/DIG. 11 |
| 2,475,277 | 7/1949 | Budnik | 428/99 |
| 2,522,072 | 9/1950 | Tierney, Jr. | 174/DIG. 11 |
| 2,585,054 | 2/1952 | Stachura | 174/DIG. 11 |
| 2,960,561 | 11/1960 | Plummer | 428/99 |
| 3,455,336 | 7/1969 | Ellis | 174/DIG. 11 |

*Primary Examiner*—Paul R. Michl
*Assistant Examiner*—Thorl Chea
*Attorney, Agent, or Firm*—John T. Synnestvedt; Charles H. Lindrooth

[57] ABSTRACT

Disclosed herein is a wraparound closure device which includes an axially compressible, radially expansible tubular member which is made from a fabric of engineering plastic. The member is axially split to define a first and a second mating edge. Fastening means are connected to the mating edges for selectively opening and closing the member. The fastening means is fixed in length and thereby when it is connected to the tubular member, the tubular member is also fixed in length. However, the tubular member remains radially variable and expands and contracts to adapt to the shape of a substrate to be enclosed. Also disclosed herein is a method for making such a device.

4 Claims, 2 Drawing Sheets

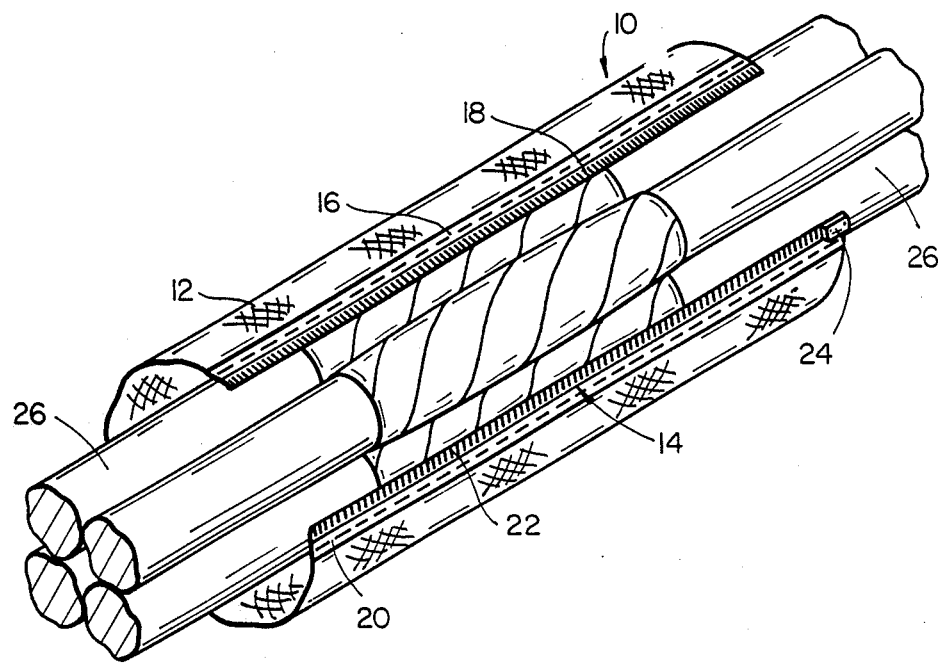
FIG_1
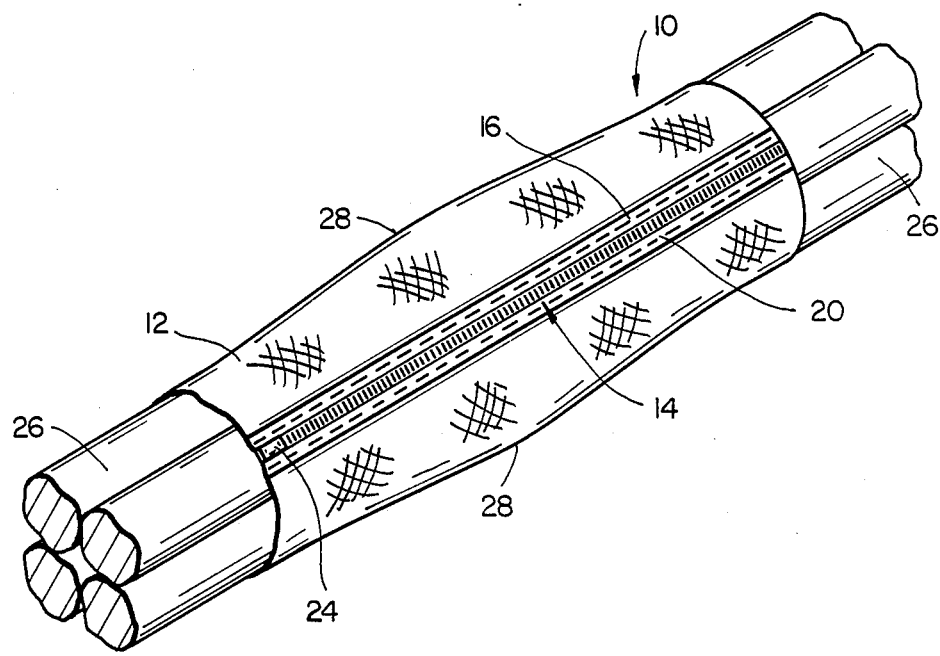
FIG_2

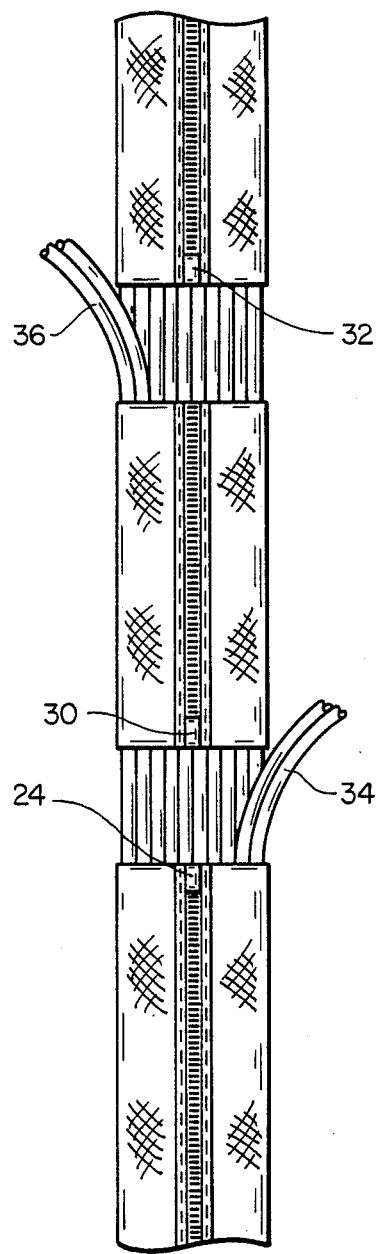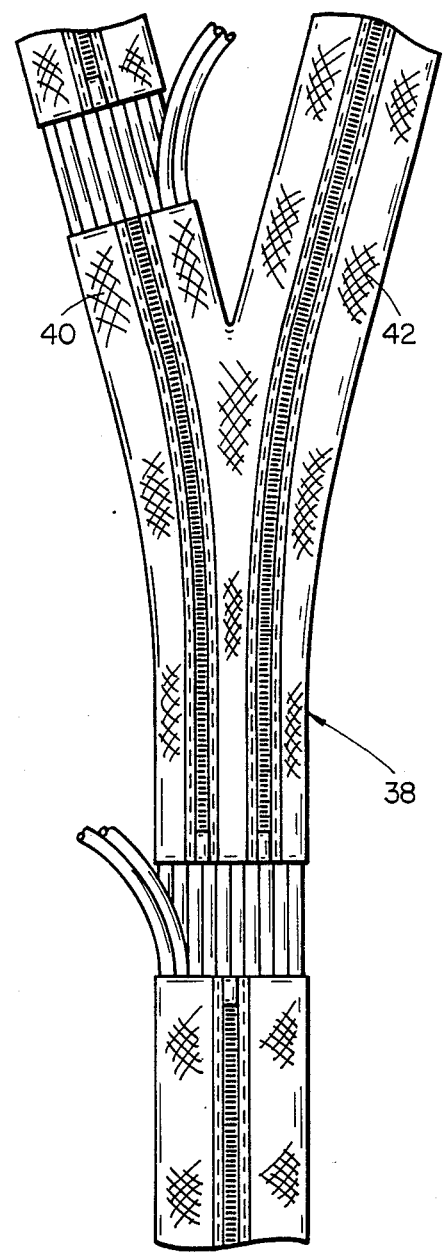
FIG_3              FIG_4

WRAPAROUND CLOSURE DEVICE AND A METHOD OF MAKING SAME

FIELD OF THE INVENTION

This invention relates to a wraparound closure device made from fabric and a method of making same. More particularly, this invention relates to such a wraparound closure device having a variable radius which protects elongate substrates from abrasion and which is used for handling of such substrates.

BACKGROUND OF THE INVENTION

Manufacturers and users of cables and similar elongate articles desire to protect such articles from the effects of abrasion. As is well established, abrasion inhibits a cable's performance and, if severe enough, may lead to a failure in the system employing such a cable. Additionally, safety considerations warrant that electrical cables and the like maintain their mechanical and electrical integrity. For example, if an outer dielectric of a cable becomes frayed, for instance from abrasion, electricity may inadvertently come into contact with a user causing electrical shock or serious injury.

Additionally, manufacturers and users of cables and similar elongate substrates require a device which can be used to bundle cables. Bundling cables in a tight package reduces the abrasiveness of one cable against another. Cables very often have an irregular diameter. A joint, splice, mend or the like causes a cable to have a larger diameter at one section than another. Additionally, within the bundle there may be many different irregular diameters at various sections of each cable or there may be one particular section, such as at a joint where all of the cable have an enlarged diameter. An effective bundling device must be able to handle these diametric irregularities.

Very often in an electrical or fluid system there will be need for a cable or hose or the like to be separated from the main stream of such elongate substrates. These points or sections of the system are known as break-out points or simply break-outs. An effective bundling device must be able to accommodate not simply one break-out but a series of such break-outs known as multiple break-outs.

Ideally, manufacturers and users of cable and other similar elongate substrates, desire to have the abrasion resistant protection and the bundling function performed by a single device.

In order to satisfy industry needs with respect to both abrasion and bundling there has been developed a number of products. One particular product is made by Bentley-Harris Manufacturing Company of Lionville, Pennsylvania and sold under the federally registered trademark EXPANDO. Expando sleeving is a braided tubular article made from a strong plastic material, such as polyester.

The EXPANDO sleeving functions similar to a "chinese finger" trap in that it is axially compressible and radially expansible and vice versa. In use, the cables or similar articles are loaded into the sleeving by axially compressing the sleeve which causes the sleeve to radially expand. In addition, the overall length of the sleeving decreases in direct proportion to its radial expansion.

EXPANDO sleeving is very often used for bundling. A number of cables are loaded into the sleeving with the sleeve in its axially compressed and radially expanded condition. After loading, the sleeve is axially expanded and radially compressed to firmly hold the cables of the bundle in fixed relation to one another.

The EXPANDO sleeving prevents abrasion of the cable during installation by providing an outer surface other than the cable's own protective surface which can absorb the mechanical abuse of such installation. During use, the sleeving prevents one cable from rubbing against another cable by providing this protective outer layer between the cables. In bundling applications, the sleeving fixes the position of one cable relative to another cable and thereby prevents internal bundle abrasion in use and installation.

While effectively solving many of the above mentioned problems, Expando sleeving is lacking in certain respects. Since the Expando sleeving forms a continuous tubular article it must be slipped on prior to final installation of electrical cable and the like. Additionally, if a cable fails, the sleeving would have to be, at least in part, destroyed in order for the repairmen to gain access to the cable.

Cable break-outs present another difficulty in using the Expando sleeving. Although break-outs may be accommodated, it must be done with a plurality of sleeves of pre-determined lengths.

SUMMARY OF INVENTION

The purpose of this invention is to provide a variable diameter wraparound closure device for protecting elongate substrates, such as cables, tubing and the like, from abrasion. Another purpose of this invention is to provide such a wraparound device and a method of making same which is useful in bundling such elongate substrates after final installation of same.

To accomplish the purpose of the invention as set forth above and the objects and advantages of the invention as set forth herein, the instant invention of an abrasion resistant variable diameter closure device, comprises, an axially compressible, radially expansible tubular member, the member being made from a fabric of engineering plastic, the member being axially split to define a first and a second mating edge and fastening means connected to the mating edges for selectively opening and closing the member, the fastening means being of a fixed length, thereby the radius of the member expands and contracts, adapting to irregularly-shaped substrates.

The device of the instant invention is particularly useful where the elongate substrate to be enclosed in already finally installed. For example, where a system of cables have already been connected to the device and the power supply for the device, it is highly undesirable to disconnect the cable and slip on sleeving. It is far more efficient to use a wraparound sleeve which encloses the cables that have been finally installed. The user merely wraps the device of the instant invention around the cables, fastens the member closed the desired length and the cables are both bundled and protected from abrasion.

In the case where the cables are of irregular diameters, the member expands and contracts diametrically to accommodate such irregularities. Thus, where there is a splice in a number of cables to be bundled by the instant invention, the member bulges at that section while remaining fixed in length.

In a cable system or the like elongate substrates to be bundled where a break-out is desired, a preferred embodiment of the device of the instant invention is particularly useful. In the preferred embodiment, the fastening means comprises a zipper having a first portion connected to the first edge and a second portion connected to the second edge and at least two (2) operative members slidably and selectively opening and closing the member.

The cable or cables to be broken out are slipped through that section of the member which has been selectively left open. It will be appreciated that by using two or more operative members for selectively opening and closing the member, one section of the member may be open while all others are closed to form a continuous tubular article.

In some applications it may be desirable for the preferred embodiment to include a tubular member which forms a Y-shaped article, for example, where the user knows the location of the cable break out and where continuous abrasion resistance is desired. This preferred embodiment may include one or two or more operative members as desired.

It is particularly useful to form the member by braiding it from fiber of engineering plastic. Materials in the family of engineering plastics include plastics that have a tensile modulus of greater than 50,000. Examples of engineering plastics are the olefin polymers of which are poly 4-methyl pentene and fluorinated polyolefins for ethylenetetrafluoroethylene copolymers, and vinylidene fluoride polymers, especially polyvinylidene fluoride and blends thereof, for example, the fluorinated olefin blends as described and claimed in British Patent No. 1,120,131 polyesters, for example, polyethylene terephthalate, polytetramethylene terephthalate for example that treated as described in U.S. Pat. Nos. 3,968,015; 4,073,830; and 4,113,594, polyphenyleneoxide and -sulphide, blends of polyethylene oxide with styrene, silicone-carbonate block copolymers, polyketones, such as polyarylether ketones, for example, those described and claimed in U.S. Pat. Nos. 3,953,400; 4,024,314; 4,229,564; 3,751,398; 3,914,298; 3,965,146; and 4,111,908, polysulphones, for example, polyaryl sulphones, polyarylethere sulphones, polyetherimides, for example those described in U.S. Pat. No. 3,847,867, polycarbonates especially those derived from bis phenol-A, polyamides, especially those described and claimed in , epoxy U.S. Pat. Nos. 3,551,200 and 3,677,921 resins and blends of one or more of the above mentioned polymeric materials either with each other or with other polymeric materials. A more detailed discussion of the above materials is found in British Specification No. 1,529,351 which is incorporated herein by reference. It is especially preferred to use polyester as the material for the fiber.

The invention is also directed to a method of making the above described wraparound device. In particular, the steps for making the device comprise; forming an axially compressible, radially expansible elongate tubular member, cutting the member to the desired length, adjusting the member to the desired radius, connecting a fastening means to the member along its entire length, the fastening means being capable of being selectively axially opened along its entire length and splitting the member axially along a line directly adjacent to the opened fastening means.

A further preferred method of making the instant invention includes connecting the fastening means to the member by ultrasonically welding it to the member. It is further preferred that the member be formed by braiding. And in a still more preferred method of making the wrapround device in accordance with this invention it is preferred that the member be split simultaneously with the opening of the fastening means.

It is an object of this invention to provide a fabric wrapround closure device which is used for enclosing elongate articles such as cables and the like to protect such articles from abrasion and to bundle such articles.

It is a further ojbect of this invention to provide such a wraparound closure device as described which has a fixed length and a variable diameter.

These, and other objects and advantages of the invention, will be appreciated more fully hereinafer with reference to the accompanying drawing wherein:

BRIEF DESCRIPTION OF THE DRAWING

FIG. 1 illustrates the wraparound closure device of the instant invention prior to closure.

FIG. 2 illustrates the device of FIG. 1 after closure.

FIG. 3 illustrates the wraparound closure device of this invention used in connection with a cable break-out.

FIG. 4 illustrates an alternative embodiment of the wraparound closure device in accordance with this invention used in connection with a cable branch-off and cable break-outs.

DETAILED DESCRIPTION OF THE PREFERRED EMBODIMENTS

Referring to the drawing wherein reference characters designate like or corresponding parts throughout the several views and referring particularly to FIG. 1, there is shown the wraparound closure device in accordance with this invention, generally indicated by the numeral 10.

The device 10 includes an axially compressible, radially expansible tubular member 12. As defined herein, axially compressible, radially expansible means that when the member 12 is subjected to an axially compressing force, it radially expands and when subjected to an axially expanding force it radially contracts. In essence, the tubular member 12 acts as a "chinese finger" trap prior to connection of the fastening means, as well be described in further detail below.

The member 12 is a braided fabric. As used herein, fabric means any woven, knitted, plaited, braided, felted or non-woven material made of fibers or yarns. The fabric can be knitted, made on a loom, needled, or constructed in some other fashion. The fiber of member 12 is a monofilament of polyester, but multifilament yarns and the like are also contemplated by this invention. And as pointed out above, the fiber may be made from any engineering plastic as contemplated by this invention.

In making the closure device 10, a fastening means 14 is connected to member 12. The fastening means is fixed axially (fixed lengthwise) and once connected to the member 12, the length of member 12 is also fixed. However, the radius of member 12 expands and contracts to adapt to the irregular diamteter of substrates to be enclosed.

The fastening means 14 is connected to member 12 by ultrasonically spot welding. It will be appreciated that other means of connection including mechanical means, especially where the member 12 is made from fiber glass may also be used.

The fastening means 14 comprises a zipper having a first portion 16 with teeth 18 and a second mating portion 20 with mating teeth 22. The fastening means 14 includes an operative member 24 for selectively opening and closing the closure device 10.

After ultrasonically welding the fastening means 14 into member 12, member 12 is axially split on a line directly adjacent where teeth 18 and 22 mate. The fastening means 14 is connected in its fully zipped up or closed condition as illustrated in FIG. 2. The member 12 is split by an ultrasonic device. As the fastening means is unzippered or opened, the ultrasonic device is activated, simultaneously splitting the member 12 as the fastening means 14 is opened. The member 12 is split in the above fashion along its entire length. It will be appreciated that the member may be split axially with any cutting tool, for example, a hot knife or scissors and other mechanical and non-mechanical means.

In use the closure device 10 is wrapped around elongate substrates, such as cables 26. As pointed out above, it is often desirable to protect and bundle cables which have already been fully installed, such as cables 26. Additionally, the closure device 10 must be able to accommodate variable size diameter cable. As shown in FIG. 1 and FIG. 2, the cables 26 have been spliced such that their individual radius as well as the bundle radius varies from one point to the next.

As shown in FIG. 2, the closure device 10 has been zipped up or closed around cables 26. The member 12 bulges or expands its diameter at section 28 to accommodate the splices of cables 26, while remaining fixed in length.

With particular reference to FIG. 3, there is shown the closure device 10 having additional operative members 30 and 32. This preferred embodiment accommodates a break-out or multiple break-outs as illustrated at sections 34 and 36. It will be appreciated that the closure device may include as many operative members as needed to accommodate such break-outs.

With particular reference to FIG. 4, there is shown a "Y-shaped" closure device 38 having a plurality of operative members and two separate legs 40 and 42. This preferred embodiment is especially useful as described above.

The invention also includes a method of making a closure device comprising the steps of forming an axially compressible, radially expansible elongate tubular member from fabric, adjusting the member to the desired radius, connecting a fastening means to the member along its entire length, the fastening means being capable of being selectively axially opened along its entire length, and splitting the member axially along a line directly adjacent to the opened fastening means.

Alternately, the member may be adjusted to the desired radius by placing it around a mandrel. It will be appreciated that it should be placed loosely around the mandrel so that the diameter may expand and contract as needed. Additionally, it will be appreciated that the tubular member may be heat-shocked in place to the desired radius and to any desired irregular shape creating a slightly less expansible, compressible member, but one which may be sufficient for certain applications.

While the instant invention has been described by reference to what is believed to be the most practical embodiments, it is understood that the invention may embody other specific forms not departing from the spirit of the invention. It should be understood that there are other embodiments which possess the qualities and characteristics which would generally function in the same manner and should be considered within the scope of this invention. The present embodiments therefore should be considered in all respects as illustrative and not limited to the details disclosed herein but are to be accorded the full scope of the claims, so as to embrace any and all equivalent apparatus and articles.

I claim:

1. A method of making a closure device, comprising the steps of:
   forming an axially compressible, radially expansible elongate tubular member from braided fibers of engineering plastics;
   adjusting the tubular member to of the desired radius;
   connecting a fastening means to the tubular member axially along its length, the fastening means being capable of being selectively axially opened along its length; and
   after connecting the fastening means, splitting the tubular member axially along a line adjacent to the opening in the fastening means.

2. A method according to claim 1 wherein the tubular fastening means is connected to the member by ultrasonic welding.

3. A method according to claim 1 wherein the tubular member is split axially simultaneously with the fastening member being opened.

4. A method according to claim 1 wherein the tubular member is adjusted to the desired radius by placing it loosely around a mandrel.

* * * * *

UNITED STATES PATENT AND TRADEMARK OFFICE
CERTIFICATE OF CORRECTION

PATENT NO.  : 4,891,256
DATED       : January 2, 1990
INVENTOR(S) : Joseph S. Kite III, Thomas B. Conaghan III, John P. Cattell and Richard B. Develine It is certified that error appears in the above-identified patent and that said Letters Patent is hereby corrected as shown below:

Column 3, lines 46 & 47, "in , epoxy U.S. Pat. Nos. 3,551,200 and 3,677,921 resins" should be --in U.S. Pat. Nos. 3,551,200 and 3,677,921, epoxy resins--

Column 6, line 40, delete "tubular"

Column 6, line 41, before "member" insert --tubular--

Signed and Sealed this

Twenty-third Day of July, 1991

Attest:

HARRY F. MANBECK, JR.

*Attesting Officer*

*Commissioner of Patents and Trademarks*